L. ARKIN.
FASTENER.
APPLICATION FILED DEC. 6, 1917.

1,275,357.

Patented Aug. 13, 1918.

Inventor:
Lowis Arkin,
by Rohrts Rohrts & Cushman
his Attorneys.

UNITED STATES PATENT OFFICE.

LOUIS ARKIN, OF BOSTON, MASSACHUSETTS.

FASTENER.

1,275,357.　　　　　Specification of Letters Patent.　　Patented Aug. 13, 1918.

Application filed December 6, 1917. Serial No. 205,734.

*To all whom it may concern:*

Be it known that I, LOUIS ARKIN, a citizen of the United States, and resident of Boston, in the county of Suffolk and State of Massachusetts, have invented new and useful Improvements in Fasteners, of which the following is a specification.

This invention relates to separable fasteners of the general class comprising complemental stud and socket members commonly used as fastening means for dresses, gloves, automobile curtains and similar purposes. More particularly it relates to separable fasteners of the type shown in Letters Patent of the United States No. 1,225,741, granted to me on May 15, 1917, in which means are provided for forcing the stud from the socket without manipulation of said stud.

In my said patent the means provided for forcing the stud from the socket comprises a resilient member located wholly within the socket and which is stressed by the stud upon its insertion therein. While this construction has proved satisfactory and adequate under many conditions of service, for certain uses I have discovered that various novel results may be attained by locating the resilient member outside the casing.

The location of the resilient member inside the casing as in my said patent necessitates the provision of a relatively large space in which the spring may be freely actuated by the stud so that it is difficult with this construction to make the socket thin enough to adapt it for use as a fastening means on light and thin dresses, silks or laces where it is essential that the material lie smooth and flat.

It is the principal object of this invention to provide a fastener in which the resilient member for forcing the stud from the socket is so disposed that the socket member may be made very thin and so meet the peculiar requirements of service to which I have referred.

Referring to the drawings which illustrate certain embodiments of the invention,—

Figure 1:
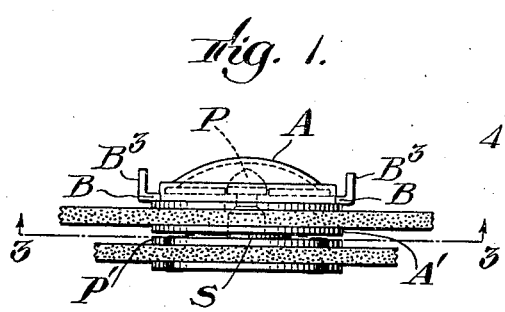
Figure 1 is a longitudinal section of one embodiment of the invention showing the parts engaged.
Figure 2:
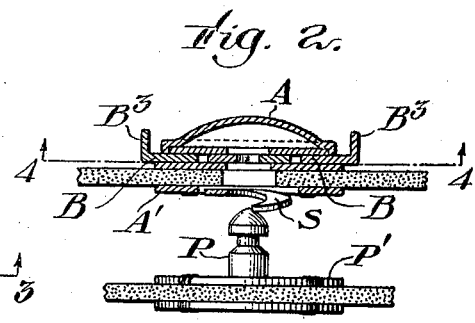
Fig. 2 is a similar view showing the parts disengaged.
Figure 3:
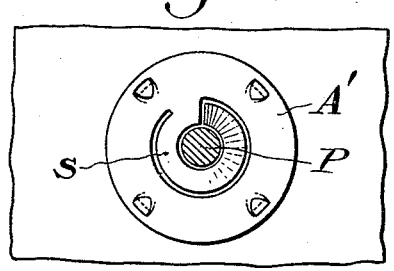
Fig. 3 is a section on the line 3—3, Fig. 1, showing the bottom of the socket member.
Figure 4:
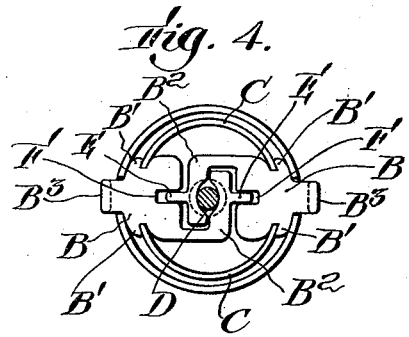
Fig. 4 is a section on the line 4—4, Fig. 2.

The socket member of the fastener is of the usual contour and comprises a dome or casing A and a base plate A'. Within said casing are complemental stud retaining means preferably but not essentially of the construction shown consisting of a pair of stud retaining plates B located and movable in the same plane, pressed together and yieldingly held in normal position by one or more springs C (Fig. 4) which engage lugs B' provided on said plates. Each of said retaining plates has a notched hook-like end B² whereby said plates are interlocked. Said ends engage each other when the plates are in normal position as best shown in Fig. 4, the notches forming a stud aperture D located in the path of the stud and into which the stud is adapted to enter upon its insertion into the casing A.

Each of said hooked ends B² is further provided with a guide E and the body portions of the plates have complemental guide channels F, the guide E of one plate extending into the complemental guide channel F of the other plate to insure the movement of said plate in the same line.

B³ are the stud releasers preferably formed integral with the plates B and extending outside said casing through slots in the wall thereof. Preferably the releasers are upturned, as shown, to provide stops adapted to engage the wall of the casing when said releasers are pressed inward to release the stud in the manner hereinafter described.

Disposed between the base plate of the casing and the usual stud flange, and wholly outside the casing, is a resilient member adapted to be stressed by the insertion of the stud into the socket and to be so held until the stud is released. While this resilient member may be of any suitable form or construction and is not necessarily formed integral with either the stud or socket members, the construction shown in the drawings has been found preferable.

Figure 5:
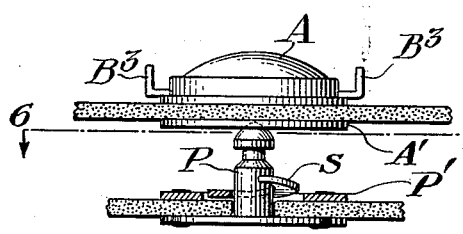
Fig. 5 is a view similar to Fig. 2 showing an alternative form.
Figure 6:
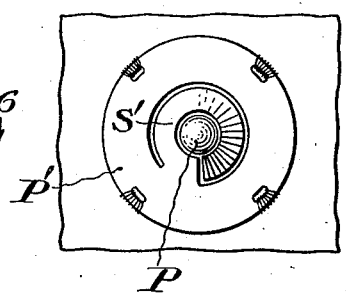
Fig. 6 is a top plan of the stud member viewed from the line 6—6, Fig. 5.

In the form of the invention shown in Figs. 1 to 4 the base plate A' of the socket is sheared and bent outward to form an integral spring member S extending part way around the stud-receiving aperture and adapted to be engaged and stressed by the flange P' of the stud P when said stud is inserted into the casing. The fastener shown in Figs. 5 and 6 is similar both in construction and operation to that illustrated in Figs. 1 to 4 but instead of striking up the spring from the base plate A' of the socket member a spring tongue S' is struck up from the flange P' of the stud member, the tongue S' extending part way around the stud P and being adapted to be engaged and stressed by the plate A' when the stud is inserted into the socket.

The operation is as follows: When the stud P is inserted into the casing A its head enters the aperture D formed by the notched retaining plates and, forcing said plates apart, passes between them, whereupon said plates close around the notched neck of the stud so that said stud is firmly held within the casing, the spring S being engaged and held under stress by the stud flange P'. To release the stud, the releasers B³ are simultaneously pressed inward, whereupon the hooked ends B² of the plates B are opened releasing the stud so that its head is free to pass between said plates and the spring S being thus released jumps or forces the stud from the socket.

It will be apparent that by disposing the resilient member between the socket and stud, wholly outside the socket, in the form shown, the socket member may be made so thin as not to project outwardly from the fabric. In this way the socket member is rendered more sightly and less liable to get caught by garments and the like and be injured. Moreover, the spring may be readily repaired or replaced when disposed outside the casing.

I claim:

1. A fastener comprising a stud, a casing having an aperture adapted to receive the stud member, holding means for retaining the stud in said aperture, and yielding means disposed outside said casing for separating the stud and casing when the holding means is released without manipulation of said stud.

2. A fastener comprising complemental stud and socket members, holding means for retaining the stud member in the socket member, and yielding means outside of said stud and socket members for separating the members when the holding means is released without manipulation of said stud.

3. A fastener comprising complemental stud and socket members, holding means for retaining the stud member in the socket member, and a spring tongue between the bases of the stud and socket members for separating the members when the holding means is released without manipulation of said stud.

4. A fastener comprising complemental stud and socket members, said socket member having a stud-receiving aperture and stud retaining and releasing means, and a resilient member disposed between the bases of the stud and socket members adapted to be stressed upon engagement thereof and to force the stud from the socket without manipulation of the stud.

5. A fastener comprising complemental stud and socket members, said socket member having a stud-receiving aperture and stud-retaining and releasing means, one of said members being provided with a resilient member adapted to be stressed between the bases of the members upon engagement of the stud and socket and to force the stud from the socket without manipulation of the stud.

6. A fastener comprising complemental stud and socket members, said socket member having a stud-receiving aperture and stud-retaining and releasing means and said stud member having a flange, and a resilient member on said socket adapted to be engaged and stressed by said flange upon insertion of the stud into the socket and to force the stud from the socket without manipulation of the stud.

7. A fastener comprising complemental stud and socket members, said socket member having a stud-receiving aperture and stud-retaining and releasing means and said stud member having a flange, and a spring tongue integral with said socket adapted to be engaged and stressed by said flange upon insertion of the stud into the socket thereby to force the stud from the socket.

Signed by me at Boston, Massachusetts, this 1st day of December, 1917.

LOUIS ARKIN.